(12) United States Patent
Shirokoshi

(10) Patent No.: US 10,883,592 B2
(45) Date of Patent: Jan. 5, 2021

(54) CUP-TYPE STRAIN WAVE GEARING

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 16/477,227

(22) PCT Filed: Dec. 8, 2017

(86) PCT No.: PCT/JP2017/044206
§ 371 (c)(1),
(2) Date: Jul. 11, 2019

(87) PCT Pub. No.: WO2019/111409
PCT Pub. Date: Jun. 13, 2019

(65) Prior Publication Data
US 2019/0353236 A1 Nov. 21, 2019

(51) Int. Cl.
*F16H 33/00* (2006.01)
*F16H 35/00* (2006.01)
(Continued)

(52) U.S. Cl.
CPC ................. *F16H 49/001* (2013.01)

(58) Field of Classification Search
CPC .................. F16H 49/001; F16H 2049/003
See application file for complete search history.

(56) References Cited

U.S. PATENT DOCUMENTS 5,269,202 A * 12/1993 Kiyosawa ............. F16H 49/001
74/640
5,458,023 A * 10/1995 Ishikawa ............. F16H 55/0833
74/640

(Continued)

FOREIGN PATENT DOCUMENTS

JP 2007211907 A 8/2007
JP 2017137882 A 8/2017

OTHER PUBLICATIONS

International Search Report (PCT/ISA/210) dated Mar. 13, 2018, by the Japanese Patent Office as the International Searching Authority for International Application No. PCT/JP2017/044206.
(Continued)

*Primary Examiner* — Jake Cook
(74) *Attorney, Agent, or Firm* — Buchanan Ingersoll & Rooney PC

(57) ABSTRACT

A strain wave gearing has a rigid internally toothed gear, a flexible externally toothed gear, and a wave generator. Before being flexed by the wave generator, the externally toothed gear has a cylindrical body part, an inside diameter of which is such that the inside diameter D is smallest at a rear end thereof and increases gradually from the rear end to an opening end thereof. After being flexed by the wave generator, $D1 \leq D$ is satisfied where D1 is the minor diameter of an elliptical inner circumferential surface of the opening end of the cylindrical body part. The externally toothed gear, which is provided with such a tapered cylindrical body part, is suitable for manufacturing by die molding such as casting, and can also alleviate excessive uneven contact thereof with a wave bearing.

2 Claims, 4 Drawing Sheets

(51) Int. Cl.
 *F16H 37/00* (2006.01)
 *F16H 49/00* (2006.01)

(56) References Cited

U.S. PATENT DOCUMENTS

| | | | |
|---|---|---|---|
| 8,661,940 B2 * | 3/2014 | Ishikawa | F16H 55/0833 74/640 |
| 2003/0115983 A1 * | 6/2003 | Wang | F16H 49/001 74/640 |

OTHER PUBLICATIONS

Written Opinion (PCT/ISA/237) dated Mar. 13, 2018, by the Japanese Patent Office as the International Searching Authority for International Application No. PCT/JP2017/044206.

\* cited by examiner

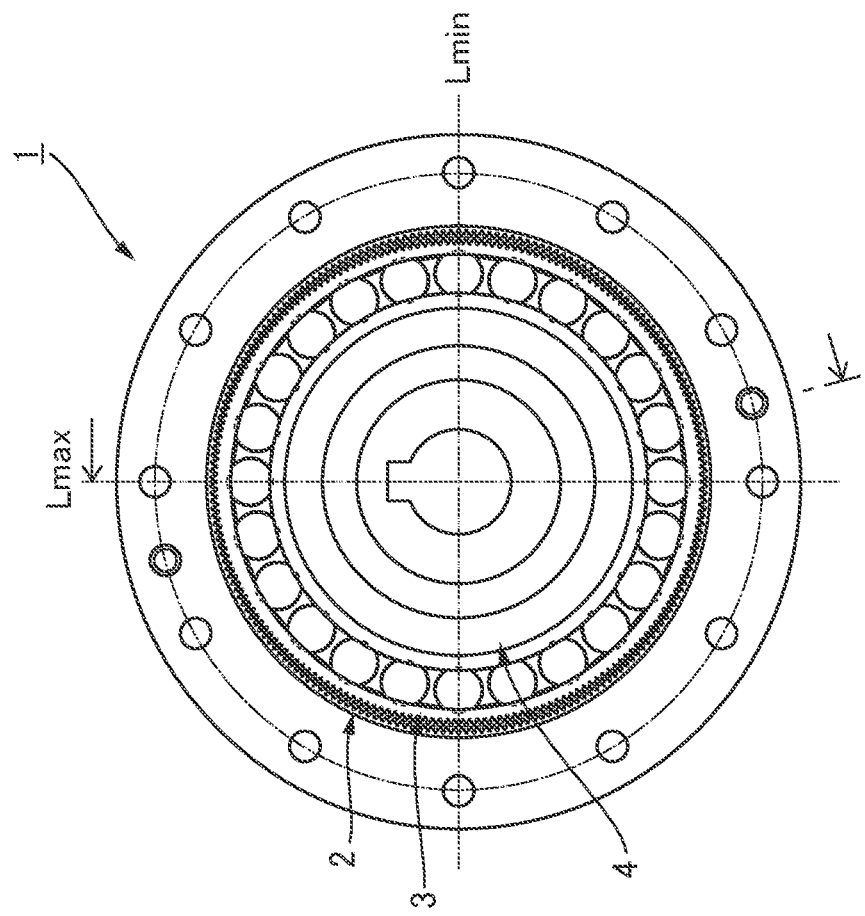
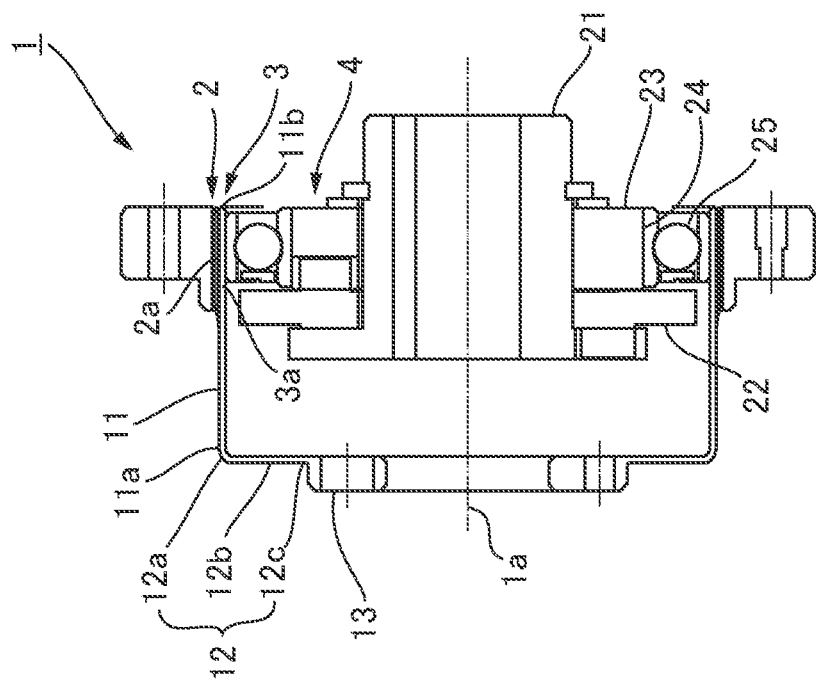
FIG. 1(a)
FIG. 1(b)

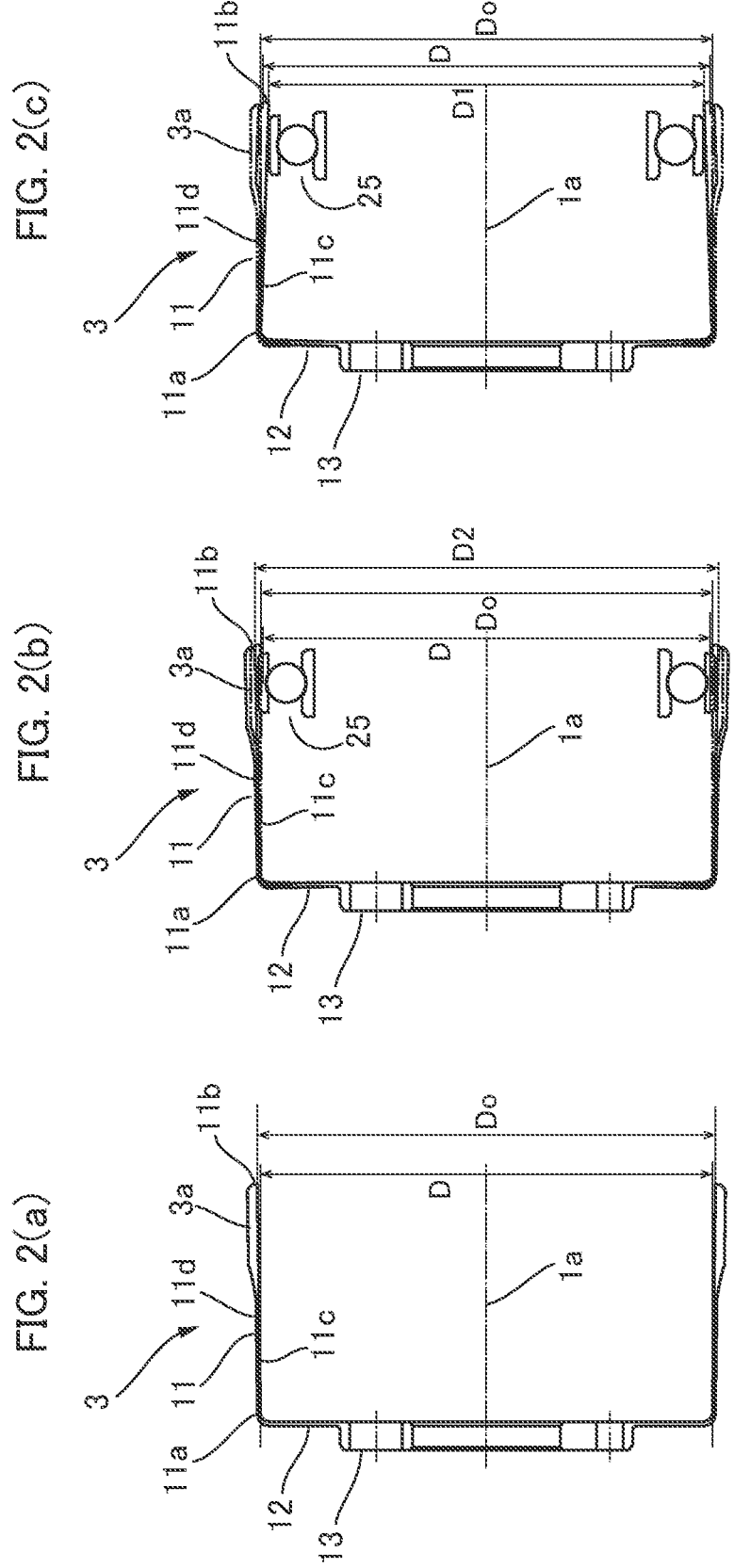

CUP-TYPE STRAIN WAVE GEARING

TECHNICAL FIELD

The present invention relates to a strain wave gearing, and in particular to a cup-type strain wave gearing provided with a cup-shaped flexible externally toothed gear.

BACKGROUND ART

There is known such a cup-type strain wave gearing as having a cup-shaped flexible externally toothed gear provided with a tapered cylindrical body. Patent document 1 proposes a strain wave gearing provided with an externally toothed gear of this shape.

The strain wave gearing disclosed in Patent document 1 has an externally toothed gear provided with a cylindrical body, in which a rear end at a diaphragm side of the cylindrical body has a radius that is made smaller than a minor-axis radius of an elliptical contour of a rotation-transmission member (wave generator) for flexing an opening end of the cylindrical body into an elliptical shape. In a state in which the open end portion of the externally toothed gear is flexed into an elliptical shape, the open end portion becomes a tapered shape in which the open end portion where external teeth are formed is spread out in a radially outward direction toward the open end at each position in the circumferential direction.

PRIOR ART DOCUMENT

Patent Document

Patent document 1: JP 2017-137882 A

SUMMARY OF THE INVENTION

Problems to be Solved by the Invention

A wave generator, which flexes an externally toothed gear into an elliptical shape, is generally constituted by a rigid plug having an elliptical outer circumferential surface and a wave bearing mounted between the elliptical outer circumferential surface of the plug and a portion at the open-end side of the cylindrical body of the externally toothed gear. When the cylindrical body of the externally toothed gear has a large taper angle toward the opening end thereof, the outer race of the wave bearing falls into an excessively uneven contact state with the inner circumferential surface at the open-end side of the cylindrical body.

When the open end portion where the external teeth are formed is supported by the wave bearing in an uneven contact state, unnecessary thrust force may be applied to the respective portions, the meshing depth of the externally toothed gear with the internally toothed gear may be widely changed in the tooth trace direction so that an appropriate meshing therebetween cannot be formed, or other defects may occur. In order to improve the meshing state in the tooth trace direction, it is necessary to take measures such as employing a cone tooth profile for the internally toothed gear, which accompanies an increase in manufacturing cost or other defects.

The present invention is made in the consideration of a conventional externally toothed gear provided with a tapered cylindrical body. An object of the present invention is to provide a cup-type strain wave gearing, which is suitable for manufacturing by press forming, forging, casting or other die molding and which is provided with an externally toothed gear having a tapered cylindrical body so as to alleviate defects due to uneven contact of the wave bearing.

Means of Solving the Problems

A cup-type strain wave gearing of the present invention has a rigid internally toothed gear, a flexible externally toothed gear and a wave generator. The externally toothed gear has a cylindrical body flexible in a radial direction, a diaphragm extending toward a center-axis line of the cylindrical body from one end of the cylindrical body, the one end being an rear end thereof, a rigid annular or discoid boss formed in a center-side portion of the diaphragm, and external teeth formed on an outer circumferential surface portion of the cylindrical body at a side of the other end of the cylindrical body, the other end being an open end of the cylindrical body. In addition, the wave generator flexes an open-end side portion of the cylindrical body where the external teeth are formed, into an elliptical shape to form meshing sections meshing with the internally toothed gear at plural positions separated in a circumferential direction.

Furthermore, the cylindrical body of the externally toothed gear is formed to have a shape satisfying the following conditions. Specifically, in a state before being flexed by the wave generator, the cylindrical body has an inside diameter such that an inside diameter of the rear end thereof (an rear-end inside diameter) is smallest and gradually increases from the rear end toward the open end. Similarly, the cylindrical body has an outside diameter such that an rear-end outside diameter is smallest and gradually increases from the rear end toward the open end. While, in a state being flexed by the wave generator, the open end of the cylindrical body has an elliptical inner circumferential surface, a minor diameter of which is the same as the rear-end inside diameter of the cylindrical body part or is smaller than the rear-end inside diameter. In other words, $$D1 \leq D$$

is satisfied where D is the rear-end inside diameter that is the minimum inside diameter, and D1 is the minor diameter of the elliptical inner circumferential surface of the open end of the cylindrical body part in the state being flexed by the wave generator.

In the strain wave gearing of the present invention, the cylindrical body of the externally toothed gear has a tapered shape as an initial shape (a shape before being flexed) that spreads out slightly toward the open end. It is therefore possible that the externally toothed gear be shaped to have a draft when it is manufactured by die molding such as forging, casting, press molding et al.

In addition, the cylindrical body in the elliptically flexed state is as follows: At a major-axis position of the elliptical shape of the open-end side portion where the external teeth are formed, the cylindrical body is in a taper state in which it spreads out slightly in the radial direction. While, at the minor-axis position thereof, the cylindrical body part is in a state in which no inclination is formed toward the open end or is in a reverse taper state in which it contracts slightly inward in the radial direction. The cylindrical body part has a very small taper angle so that uneven contact of the wave bearing due to the inclination of the open-end portion can be alleviated at the major-axis position where meshing state between the two gears is formed.

Here, it is possible, as the diaphragm, to employ a discoid diaphragm that has a prescribed thickness and extends in a direction perpendicular to the center-axis line from the rear end of the cylindrical body.

It is also possible, as the diaphragm, to employ a diaphragm having a shape of circular truncated cone that extends from the rear end in a direction inclined by a prescribed angle with respect to the direction perpendicular to the center-axis line. For example, such a diaphragm as having a prescribed thickness and a tapered shape can be employed, in which the inside and outside diameters thereof are gradually decreased from the rear end of the cylindrical body toward the side opposite to the open end along the center-axis line.

In either shape of diaphragm, a portion of the diaphragm connecting to the rear end of the cylindrical body has the maximum outside diameter and the maximum inside diameter, while a portion of the diaphragm connecting to the boss has the minimum outside diameter and the minimum inside diameter.

BRIEF DESCRIPTION OF THE DRAWINGS

FIG. 1(a) is a schematic longitudinal cross-sectional view illustrating a strain wave gearing of the present invention, and FIG. 1(b) is a schematic end view thereof;

FIG. 2(a) is a longitudinal cross-sectional view illustrating an externally toothed gear before being flexed into an elliptical shape, FIG. 2(b) is a longitudinal cross-sectional view illustrating a cross section of the externally toothed gear including the major axis in an elliptically-flexed state, and FIG. 2(c) is a longitudinal cross-sectional view illustrating a cross section thereof including the minor axis in the elliptically-flexed state;

MODE FOR CARRYING OUT THE INVENTION

Figure 3B:
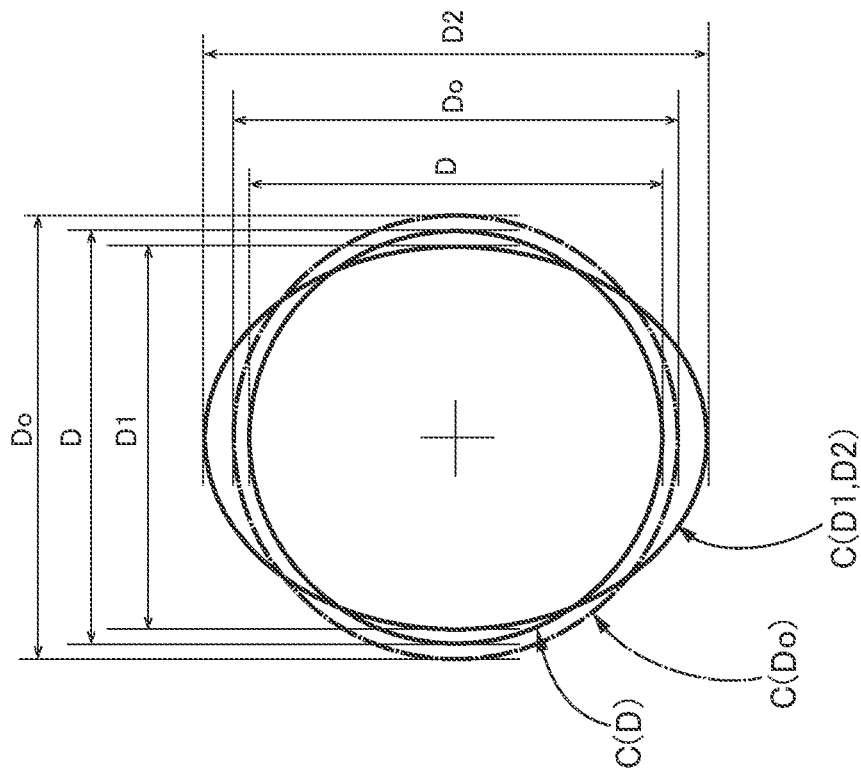
FIG. 3(b) is an explanatory view illustrating a shape of the circular inner circumferential surface of the rear end thereof, a shape of the circular inner circumferential surface of the open end thereof, and a shape of elliptical inner circumferential surface of the open end thereof.

An embodiment of a strain wave gearing according to the present invention will be described below with reference to the drawings. FIG. 1(a) is a schematic longitudinal cross-sectional view illustrating a cup-type strain wave gearing according to the present invention, and FIG. 1(b) is a schematic end view thereof. The cup-type strain wave gearing 1 (hereinafter simply refer to as the "strain wave gearing 1") is provided with an annular rigid internally toothed gear 2, a cup-shaped flexible externally toothed gear 3 concentrically arranged inside the internally toothed gear, and a wave generator 4 fitted inside the externally toothed gear.

The cup-shaped externally toothed gear 3 is provided with a cylindrical body 11, a discoid diaphragm 12 extending inward in a radial direction from one end or a rear end 11a of the cylindrical body part, an annular rigid boss 13 connected to an inner circumferential edge of the diaphragm 12, and external teeth 3a formed on an outer circumferential surface at the other end side or an open end 11b side of the cylindrical body part 11. The cylindrical body part 11 has an initial shape that is a taper shape slightly spreading out from the rear end 11a toward the open end 11b.

The diaphragm 12 is provided with: a curve portion 12a that is smoothly connected to the rear end 11a of the cylindrical body 11 and is bent perpendicularly toward the center-axis line 1a; a diaphragm main body portion 12b extending linearly in the radial direction from the end of the curve portion 12a; and a boss-side root portion 12c that is continued from the inner circumferential edge of the diaphragm main body portion 12b and is connected to the boss 13 in a manner gradually increasing in thickness.

The wave generator 4 is provided with a cylindrical hub 21, a plug 23 attached to the outer circumferential surface of the hub via an Oldham's coupling 22, and a wave bearing 25 mounted on the elliptical outer circumferential surface 24 of the plug 23. The wave bearing 25 of this example is constituted by a ball bearing. The wave generator 4 is fitted inside a portion of the cylindrical body 11 of the externally toothed gear 3 where external teeth 3a are formed. This portion of the cylindrical body 11 at the open end 11b side thereof, which is a true circle, is flexed into an elliptical shape by the wave generator 4. The external teeth 3a of the elliptically flexed portion are meshed with internal teeth 2a of the internally toothed gear 2 on both ends of the major axis Lmax of the elliptical shape.

When the wave generator 4 rotates, meshing positions of the externally tooted gear 3 with the internally toothed gear 2 are caused to move in the circumferential direction. As is well-know, this generates a relative rotation between the both gears 2 and 3 in accordance with the difference in number of teeth therebetween, and therefore one of the gears is fixed so that a reduced-speed rotation can be derived from the other of the gears.

Figure 3A:
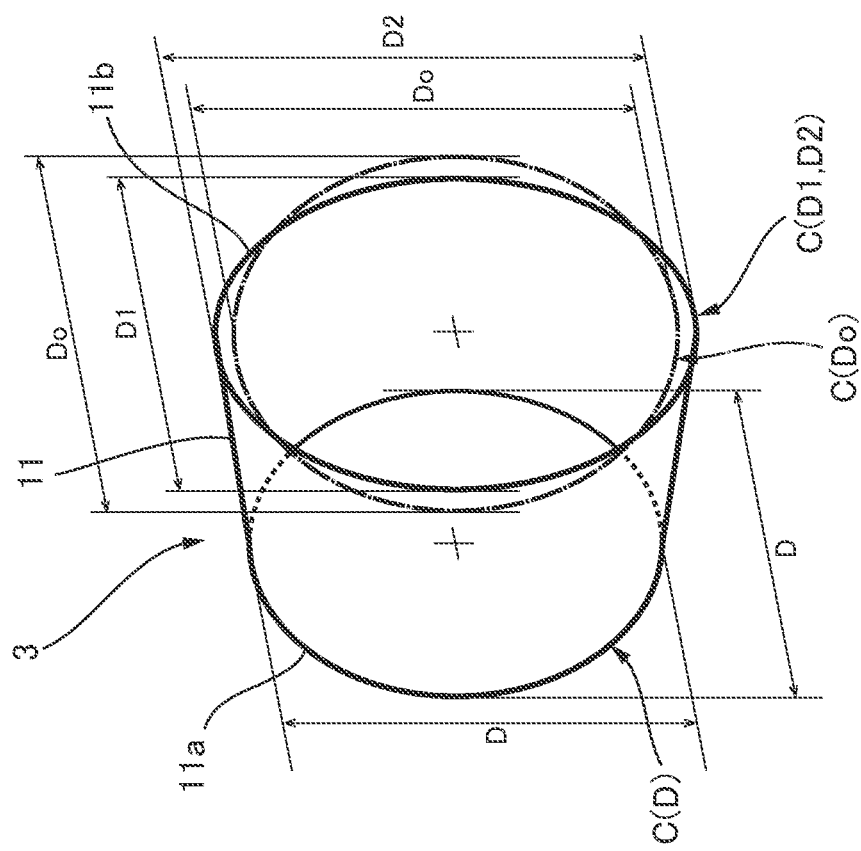
FIG. 3(a) is an explanatory view illustrating a taper shape of the cylindrical body part of a cup-shaped externally toothed gear.

FIG. 2(a) is a longitudinal cross-sectional view illustrating the externally toothed gear 3 in an initial state before being flexed into an elliptical shape, FIG. 2(b) is a longitudinal cross-sectional view illustrating a cross section of the externally toothed gear including the major axis Lmax in an elliptically-flexed state, and FIG. 2(c) is a longitudinal cross-sectional view illustrating a cross section thereof including the minor axis Lmin in the elliptically-flexed state. FIG. 3(a) is an explanatory view illustrating a taper shape of the cylindrical body of the cup-shaped externally toothed gear, and FIG. 3(b) is an explanatory view illustrating a shape of the circular inner circumferential surface of the rear end 11a thereof before flexing, a shape of the circular inner circumferential surface of the open end 11b thereof before flexing, and a shape of elliptical inner circumferential surface of the open end 11b thereof after flexing.

FIG. 2(a) illustrates an initial state of the cylindrical body 11 of the externally toothed gear 3, in other words, a state before the cylindrical body is flexed elliptically by fitting the wave generator 4 thereinto. In this state, the inner circumferential surface at each position of the cylindrical body along a direction of the center-axis line 1a, has a shape of true circle. The cylindrical body 11 is of a taper shape spreading out toward the open end 11b from the rear end 11a. Specifically, the inside diameter of the cylindrical body 11 in the initial state is gradually increased from the rear end 11a to the open end 11b, the rear-end inside diameter D at the rear end 11a is smallest, and the open-end inside diameter Do is largest.

In this example, when a cross section including the center-axis line 1a is viewed, the inner circumferential surface 11c of the cylindrical body 11 spreads out linearly in the radial direction by a constant taper angle from the rear end 11a to the open end 11b. The cylindrical body 11 has substantially a constant plate thickness, so that the outside diameter of the outer circumferential surface 11d of the cylindrical body 11 is also gradually increased in a linear fashion by a constant taper angle from the rear end 11a to the external teeth 3a at the open end 11b side. The externally toothed gear 3 has a shape, as a whole, provided with a draft in a case in when it is manufactured by die molding such as forging, casting, press molding et al.

As illustrated in FIGS. 2(b), 2(c) and 3, in a state after being flexed elliptically by the wave generator 4, the open end 11b of the cylindrical body 11 becomes to have an elliptical inner circumferential surface. An ellipse defining the elliptical inner circumferential surface is referred to as C(D1, D2), the minor diameter of the ellipse as D1 and the major diameter thereof as D2. In addition, a true circle defining the rear-end inner circumferential surface of the rear end 11a of the cylindrical body 11 before flexing is referred to as C (D) and the inside diameter (rear-end inside diameter) of the true circle as D. A true circle defining the open-end inner circumferential surface of the open end 11b is referred to as C(Do) and the inside diameter thereof as Do. The minor diameter D1, the major diameter D2, the inside diameter D of the rear end 11a and the inside diameter Do of the open end 11b satisfy the following relationship.

$$D1 \leq D < Do < D2$$

In a state being flexed into an elliptical shape, the portion of the cylindrical body 11 where the external teeth 3a are formed, becomes a tapered state in which it slightly spreads out in the radial direction toward the open end 11b at a position of the major axis Lmax of the elliptical shape. In contrast, the portion formed with the external teeth 3a at a position of the minor axis Lmin is in a state of no inclination toward the open end 11b, or is in a reverse tapered state in which the portion slightly contracts inward in the radial direction. The taper angle of the cylindrical body 11 is very small, and uneven contact of the wave bearing 25, which is caused by the inclination of the portion including the open end 11b, is alleviated at the position of the major axis Lmax where meshing between the internal teeth 2a and the external teeth 3a is formed.

The inner circumferential surface 11c and the outer circumferential surface 11d of the tapered cylindrical body 11 can be defined by a convex curve or a concave curve from the rear end 11a to the open end 11b when a cross section including the center-axis line 1a of the cylindrical body part is viewed. In addition, it is also possible for the inner circumferential surface 11c and the outer circumferential surface 11d to have different taper angles.

FIGS. 4(a) to 4(d) are explanatory views illustrating examples of externally toothed gear having a diaphragm of different shape. Respective parts corresponding to those of the above-mentioned externally toothed gear 3 are denoted by the same symbols in these drawings.

Figure 4D:
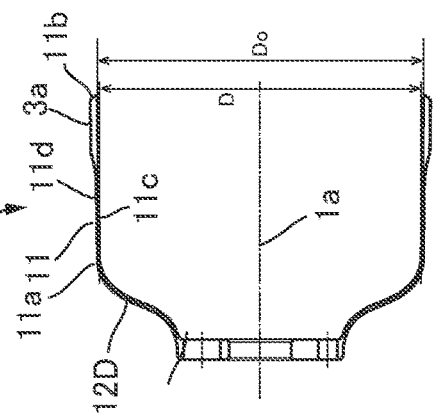
FIGS. 4(a) to 4(d) include explanatory views illustrating examples of externally toothed gear having a diaphragm of different shape.
Figure 4B:
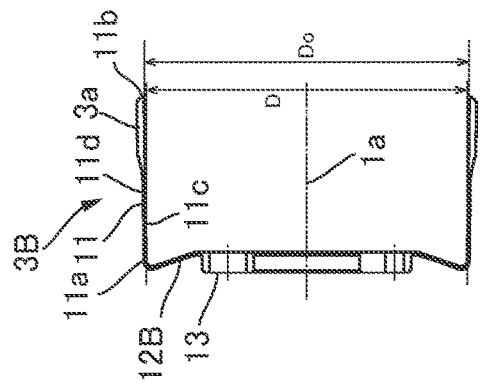
Figure 4C:
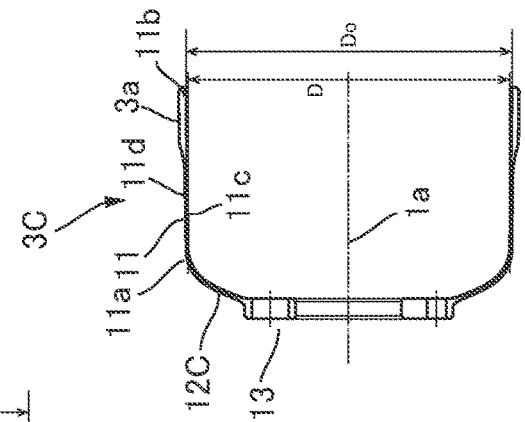
Figure 4A:
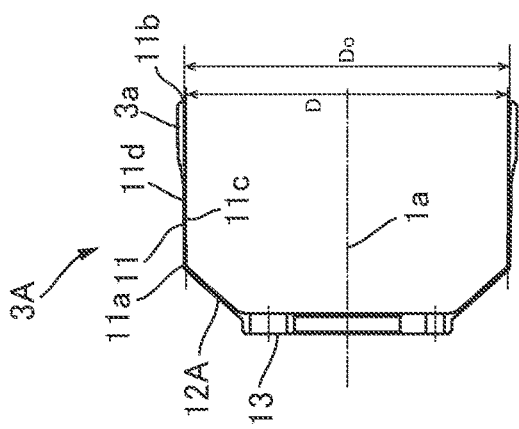

An externally toothed gear 3A illustrated in FIG. 4(a) has a diaphragm 12A provided with a shape of circular truncated cone that extends from the rear end 11a of the cylindrical body 11 in a direction inclined by a prescribed angle to a side opposite to the open end 11b with respect to a direction perpendicular to the center-axis line 1a. An externally toothed gear 3B illustrated in FIG. 4(b) has a diaphragm 12B provided with a shape of flat circular truncated cone that conversely extends from the rear end 11a of the cylindrical body 11 in a direction inclined by a small angle to a side toward the open end 11b.

An externally toothed gear 3C illustrated in FIG. 4(c) has a diaphragm 12C provided with a taper shape so that the inside diameter and the outside diameter gradually decrease from the rear end 11a of the cylindrical body 11 toward a side opposite to the open end 11b along the center-axis line 1a. The outer circumferential surface of the diaphragm 12C is defined by a convex curved surface and the inner circumferential surface thereof is defined by a concave curved surface. A diaphragm 12D of an externally toothed gear 3D illustrated in FIG. 4(d) also has a taper shape of a prescribed thickness, in which the inside diameter and the outside diameter thereof gradually decrease from the rear end 11a of the cylindrical body 11 toward an opposite side of the open end 11b along the center axis line 1a. The outer circumferential surface of the diaphragm 12D is defined by a convex curved surface and a concave curved surface, and the inner circumferential surface thereof is defined by a concave curved surface and a convex curved surface.

The tapered cylindrical body 11 is provided in either shapes of the externally toothed gears 3A to 3D. In addition, the cylindrical body part 11 has a portion that is connected to the rear end 11a thereof and has the maximum outside diameter and the maximum inside diameter, and has a portion that is connected to the boss 13 and has the minimum outside diameter and the minimum inside diameter. The externally toothed gear 3A to 3D provided with these diaphragms 12A to 12D can be employed instead of the above-mentioned externally toothed gear 3.

The invention claimed is:

1. A cup-type strain wave gearing comprising:
   a rigid internally toothed gear;
   a flexible externally toothed gear; and
   a wave generator,
   wherein the externally toothed gear has: a cylindrical body that is flexible in a radial direction; a diaphragm extending toward a center-axis line of the cylindrical body from one end of the cylindrical body, the one end being a rear end thereof; a rigid annular or discoid boss formed in a center-side portion of the diaphragm; and external teeth formed on an outer circumferential surface portion of the cylindrical body at a side of the other end of the cylindrical body part, the other end being an open end of the cylindrical body part, and
   the wave generator is configured to flex an open-end side portion of the cylindrical body where the external teeth are formed, into an elliptical shape to form meshing sections meshing with the internally toothed gear at a plurality of positions separated in a circumferential direction, and
   wherein, in a state before being flexed by the wave generator, an inside diameter of the cylindrical body is such that a rear-end inside diameter at the rear end is smallest and gradually increases from the rear end toward the open end, an outside diameter of the cylindrical body is such that a rear-end outside diameter is smallest and gradually increases from the rear end toward the open end, and
   in a state being flexed by the wave generator, the open end of the cylindrical body has an elliptical inner circumferential surface, a minor diameter of which is the same as the rear-end inside diameter of the cylindrical body part.

2. The strain wave gearing according to claim 1, wherein the diaphragm is either one of:
   a discoid diaphragm that has a prescribed thickness and extends from the rear end of the cylindrical body in a direction perpendicular to the center-axis line; and a diaphragm having a shape of circular truncated cone that extends from the rear end in a direction inclined by a prescribed angle with respect to the direction perpendicular to the center-axis line.

\* \* \* \* \*